July 21 1925.
L. R. LE LANDE
VISION PROTECTOR
Filed Sept. 1, 1923
1,546,739
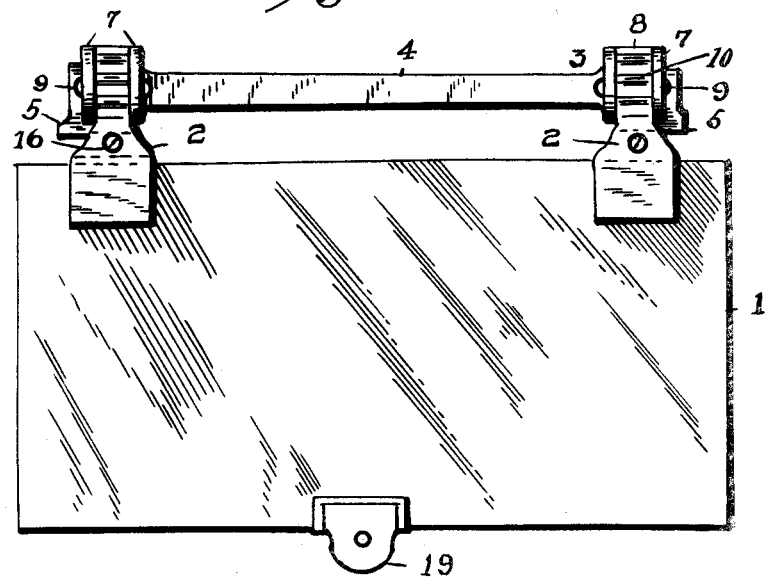
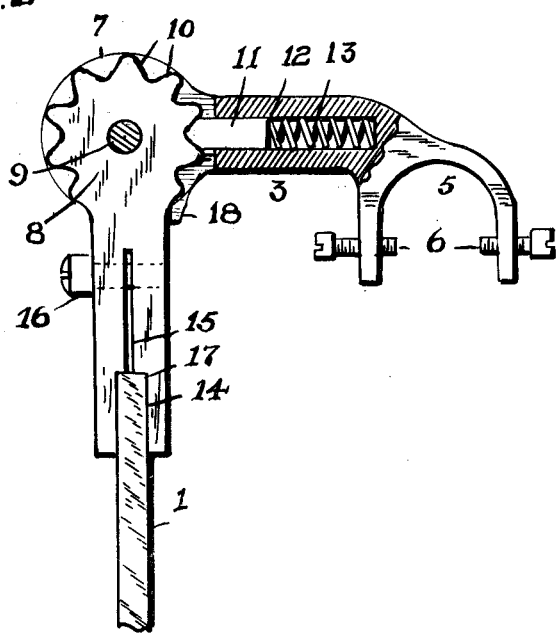
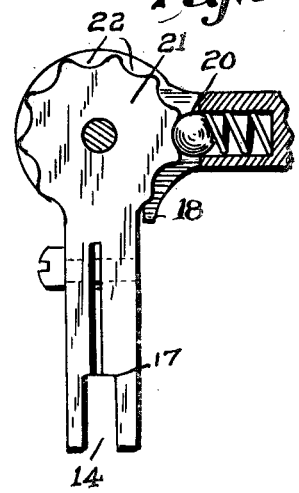
Inventor
Lester R. Le Lande
By Jack R. Snyder
Attorney Patented July 21, 1925.

1,546,739

UNITED STATES PATENT OFFICE.

LESTER R. LE LANDE, OF PITTSBURGH, PENNSYLVANIA.

VISION PROTECTOR.

Application filed September 1, 1923. Serial No. 660,469.

*To all whom it may concern:*

Be it known that I, LESTER R. LE LANDE, a citizen of the United States, residing at Pittsburgh, in the county of Allegheny and State of Pennsylvania, have invented certain new and useful Improvements in Vision Protectors, of which the following is a specification.

This invention relates to new and useful improvements in vision protectors, and while primarily designed for shielding the eyes of automobile drivers from the glaring lights of an approaching vehicle, it will be obvious that the device may be employed for any purposes wherein it is found to be applicable.

The primary object of the invention is to provide a protective device of the character stated which is automatically locked in the adjusted position when shifted to suit the convenience of the driver.

Further objects of the invention are to provide a device of the class described which is simple in its construction and arrangement, strong, durable and efficient in its use, attractive in appearance, and comparatively inexpensive to manufacture.

With the foregoing and other objects in view, which will appear as the description proceeds, the invention resides in the construction, combination and arrangement of parts hereinafter described and claimed, it being understood that changes, variations and modifications in the precise embodiment of the invention can be made within the scope of what is claimed without departing from the spirit of the invention.

In the drawing forming a portion of this specification and wherein like numerals of reference designate corresponding parts throughout the several views:

Figure 1 is a front view of a vision protector in accordance with this invention.

Figure 2 is an end view thereof with parts shown in section.

Figure 3 is a similar view of a modified form of the device.

Referring in detail to the drawing there is shown in Figure 1, a vision protector, in accordance with my invention, and adapted to be positioned on the inner side of an automobile wind-shield.

The vision protector comprises a colored glass shield 1, preferably rectangular in contour, and adjustably supported by a pair of hanger members 2, the latter being pivotally carried in respective brackets 3.

The brackets 3 are spaced from each other and are fixedly connected together by a horizontally extending integrally formed bar 4 for the purpose of maintaining the two brackets 3 in parallel alignment with respect to each other.

Each of the brackets 3 extends rearwardly and has its forward end formed to provide a depending yoke 5 adapted to engage the upper frame member of an automobile windshield and be secured to the latter by means of the screws 6 which are threadably mounted in the yoke 5.

The rear end of each of the brackets 3 is formed with a pair of spaced apertured ears 7 between which the upper end 8 of the hanger member 2 is pivotally connected by means of the pin 9.

The upper end 8, of the hanger member 2, is formed to provide a circular flat head formed with teeth 10 on its periphery. The teeth 10 are engaged by the tapered outer end of the locking bolt 11, which latter is slidably mounted in the horizontal bore 12 formed in the bracket 3. A spiral spring 13 is carried at the inner end of the bore 12 and engages the inner end of the bolt 11. The action of the spring 13 normally forces the bolt 11 outwardly against the teeth 10 of the hanger member head 8.

The lower portion, of each of the hanger members 2, is provided with a vertically extending wide groove 14 and a comparatively narrow communicating vertical groove 15. By this construction the lower portion of each of the hanger members 2 forms a clamping element as the groove 14 provides for the reception of the marginal upper edge of the shield 1 and the groove 15 permits of the contraction of the groove 14 by the adjustment of the clamping screw 16. The latter extends transversely through the lower portion of the hanger member 2 and through the narrow groove 15. The grooves 14 and 15 varying in width, a shoulder 17 is formed therebetween against which the upper edge of the shield 1 abuts, whereby the adjustment of the shield 1 in the hanger members 2 is facilitated in the assembly of the device.

In the use of the device the shield 1 is positioned to extend perpendicularly, as illustrated in Figure 2, of the drawing. The bracket 3 is provided with a lug 18 to prevent the forward movement of the shield 1 after being positioned in the operative position. However, the shield 1 may be shifted rearwardly to any desired angle when not in use regardless of the angular disposition of the wind-shield in connection with which the device is used. The engagement of the bolt 11 between adjacent teeth 10 will lock the shield in the adjusted position.

A tab 19 is fixed centrally on the lower marginal edge of the shield 1 to facilitate the manipulation of the latter to the desired position.

The modification, shown in Figure 2, is identical in construction and operation to the preferred form with the exception that a locking ball 20 is provided instead of the bolt 11, and that the hanger member head 21 is formed with a serrated periphery providing a plurality of recesses 22 adapted for the reception of the locking ball 20 associated therewith.

What I claim is:

1. A device for the purpose set forth comprising a pair of brackets each having means at one end for connection with a windshield and a pair of spaced ears at its other end, a rigid bar formed integral with the inner sides of said brackets for fixedly maintaining them in spaced relation, a hanger member extending between and adjustably connected to the ears of each pair, and a spring controlled locking element carried by each bracket forwardly of the ears and engaging said hanger members for maintaining them in adjusted position.

2. A device for the purpose set forth comprising a pair of brackets each provided with a lengthwise extending bore and a pair of ears arranged rearwardly of the bore, a rigid bar arranged between said brackets and integral with an ear of each pair, a hanger pivotally supported from each pair of ears, and means arranged in each bore for automatically locking a hanger.

3. A device for the purpose set forth comprising a pair of bracket elements, a rigid bar arranged between and formed integral with said elements, a toothed hanger pivotally connected to the rear end of each of said elements, means within and extending lengthwise of said elements and automatically engaging the teeth of the hangers to arrest movement of these latter, and means for positioning a shield with respect to and for connecting it to said hanger.

4. A device for the purpose set forth comprising a pair of bracket elements, a rigid bar arranged between and formed integral with said elements, a toothed hanger pivotally connected to the rear end of each of said elements, means within and extending lengthwise of said elements and automatically engaging the teeth of the hangers to arrest movement of these latter, and means for positioning a shield with respect to and for connecting it to said hanger, and shield arresting means depending from said elements.

5. A device for the purpose set forth comprising a pair of bracket elements, a rigid bar arranged between and formed integral with said elements, a toothed hanger pivotally connected to the rear end of each of said elements, means within and extending lengthwise of said elements and automatically engaging the teeth of the hangers to arrest movement of these latter, and means for positioning a shield with respect to and for connecting it to said hanger, shield arresting means depending from said elements and means at the forward ends of said elements for detachably connecting them to a windshield.

In testimony whereof I affix my signature.

LESTER R. LE LANDE.